United States Patent [19]
DeWitt

[11] Patent Number: 5,367,751
[45] Date of Patent: Nov. 29, 1994

[54] PANEL LOCATOR AND ATTACHMENT APPARATUS

[75] Inventor: William L. DeWitt, Lake Orion, Mich.

[73] Assignee: Chrysler Corporation, Highland Park, Mich.

[21] Appl. No.: 56,155

[22] Filed: Apr. 30, 1993

[51] Int. Cl.⁵ .............................................. A44B 21/00
[52] U.S. Cl. ...................................... 24/295; 24/293; 24/297
[58] Field of Search ................... 24/295, 293, 296, 297, 24/453; 296/187, 195, 901; 411/339, 510, 908

[56] References Cited

U.S. PATENT DOCUMENTS

| | | |
|---|---|---|
| 2,598,776 | 6/1952 | Flora ................................ 24/295 |
| 3,977,048 | 8/1976 | Benedetti ......................... 24/293 |
| 4,683,622 | 8/1987 | Oehlke ............................. 24/297 |
| 4,753,561 | 6/1988 | Betterton et al. . |
| 4,850,639 | 7/1989 | Gorski . |
| 4,858,987 | 8/1989 | Gorski . |
| 4,861,098 | 8/1989 | Gorski . |
| 4,861,208 | 8/1989 | Boundy . |
| 4,867,599 | 9/1989 | Sasajima ........................... 24/297 |
| 4,973,102 | 11/1990 | Bien . |
| 5,028,190 | 7/1991 | Loughlin, Jr. et al. . |
| 5,038,445 | 8/1991 | Jeruzal et al. . |
| 5,061,108 | 10/1991 | Bien et al. . |
| 5,098,765 | 3/1992 | Bien . |

FOREIGN PATENT DOCUMENTS

| | | | |
|---|---|---|---|
| 2496188 | 6/1982 | France | ................................ 24/295 |
| 1004798 | 9/1965 | United Kingdom | ................... 24/295 |

Primary Examiner—Victor N. Sakran
Attorney, Agent, or Firm—Mark P. Calcaterra

[57] ABSTRACT

A locator and attachment apparatus for attaching a cover panel to a trim bezel including a projecting member and clip whereby the projecting member guides the cover panel into the proper position through use of a slot on the trim bezel and the clip attached to the projecting member thereby secures the projecting member in place.

18 Claims, 2 Drawing Sheets

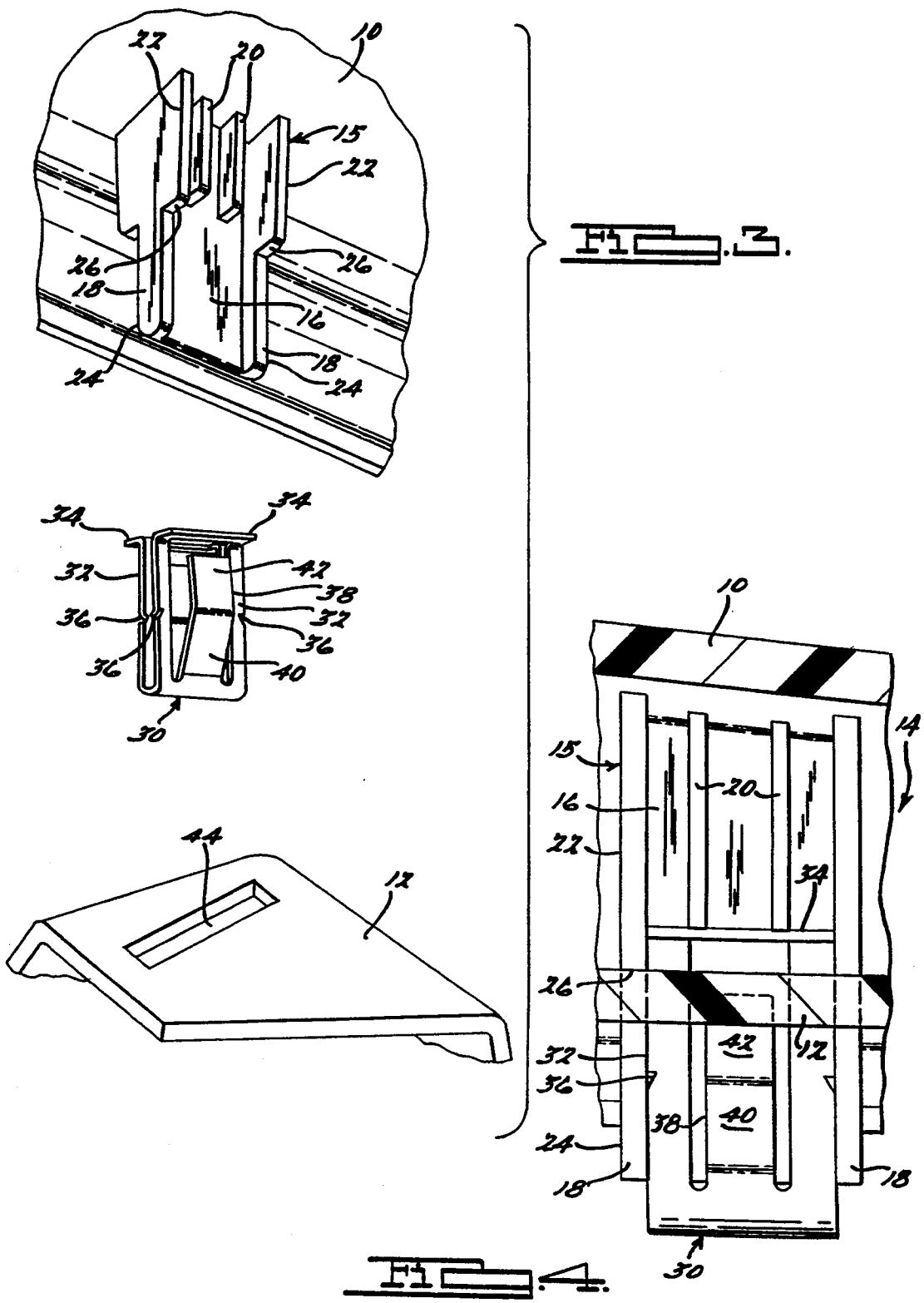

PANEL LOCATOR AND ATTACHMENT APPARATUS

BACKGROUND OF THE INVENTION

1. Field of the Invention

The present invention relates generally to an apparatus for locating and attaching panels and, more particularly, to a locator and attaching apparatus for use in attaching a cover panel to trim bezels.

2. Description of the Relevant Art

Automotive vehicles typically utilize cover panels fastened to trim bezels to provide an aesthetically appealing vehicle interior. The cover panels are mounted on the trim bezels through the use of locator pins and clips. The locator pins properly position the cover panel on the trim bezel and the clips hold it in place. Previously, apparatuses for mounting a cover panel to a trim bezel included a separate locator pin and clip assembly, including a cup support. In order for the locator pin to function properly, it must extend beyond the point of the clip, i.e., the locator pin must engage the trim bezel first. At times, because of the position and design of the cover panel, it was necessary to increase and extend the overall size and length of both the cup support and locator pin. Increasing the length and size of the cup support and locator pin resulted in several disadvantages including loss of strength and durability.

Typically, the cover panel is molded from a plastic material such as polypropylene. One disadvantage with molding polypropylene is that any member outwardly extending from the cover panel can not have a thickness greater than 50% of the thickness of the cover panel. The purpose of this limitation is to prevent a sink or depression in the outer or viewing surface. Another disadvantage of members that are extended, is that the members have a fixed or limiting thickness past which the members have a reduced overall stiffness and strength.

SUMMARY OF THE INVENTION

It is, therefore, one object of the present invention to provide a locator and attachment apparatus for use in attaching a cover panel to a trim bezel.

It is another object of the present invention to provide a locator and attachment apparatus for use with a plastic material such that the locator and attachment apparatus is of a size and dimension which prevents a sink or depression from occurring in the outer or viewing surface.

It is yet another object of the present invention to provide a locator and attachment apparatus which extends outward from a cover panel a sufficient distance to contact a trim bezel while maintaining an increased degree of strength and rigidity to allow the cover panel to be securely fastened to the trim bezel.

It is a further object of the present invention to properly position and secure a cover panel to a trim bezel.

To achieve the foregoing objects, the present invention is a locator and attachment apparatus for use in attaching a cover panel to a trim bezel. The apparatus includes a projecting member having a planar wall portion extending outwardly from the cover panel and side portions secured transverse to the wall portion. The apparatus also includes a U-shaped clip having a locking projection disposed over the wall portion. The locking projection extends outwardly away from the wall portion and the projecting member engages the trim bezel prior to the locking projections engaging the trim bezel. The projecting member first locates the proper position of the cover panel and the trim bezel prior to attaching the cover panel to the trim bezel through the use of the clip.

One advantage of the present invention is that the locator and attachment apparatus performs two functions at the same time, eliminating the need for forming two separate members and reducing the possibility for a sink or depression to occur in the outer or viewing surface of the cover panel. Another advantage of the present invention is that the locator and attachment apparatus conforms to the molding requirements of a plastic material such as a polypropylene material. Yet another advantage of the present invention is that the locator and attachment apparatus provides a shoulder or stop face to properly positioned the cover panel on the trim bezel and a clip which provides a positive locking force to maintain contact between the trim bezel and the shoulder.

Other objects, features and advantages of the present invention will be readily appreciated as the same becomes better understood after reaching the subsequent description taken in conjunction with the accompanying drawings.

BRIEF DESCRIPTION OF THE DRAWINGS

FIG. 3 is a perspective view of the locator and attachment apparatus of FIGS. 1 and 2.

FIG. 4 is an elevational view of the locator and attachment apparatus of FIG. 2.

DESCRIPTION OF THE PREFERRED EMBODIMENT(S)

Figure 1:
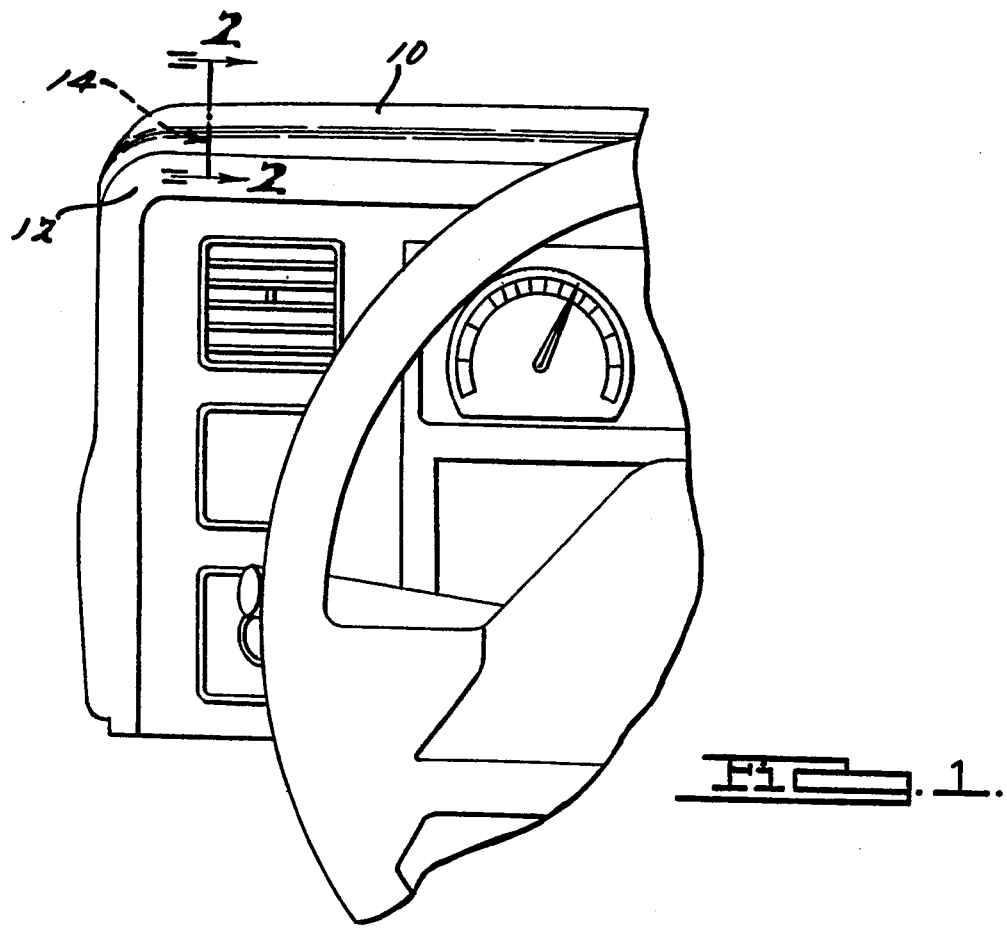
FIG. 1 is an elevational view of a locator and attachment apparatus, according to the present invention, illustrated in operational relationship with a cover panel and trim bezel of an automotive vehicle.

Referring to FIG. 1, vehicle structure such as a vehicle instrument panel of an automotive vehicle (not shown) has a cover panel 10 attached to a trim bezel 12. Typically, the cover panel 10 provides no structural support and is simply decorative in nature. The cover panel 10 is placed on the trim bezel 12 by properly locating the cover panel 10 on the trim bezel 12 and snapping it into position. It is also necessary that the cover panel 10 be removably mounted to provide accessibility for vehicle maintenance, if required, at a later date.

Figure 2:
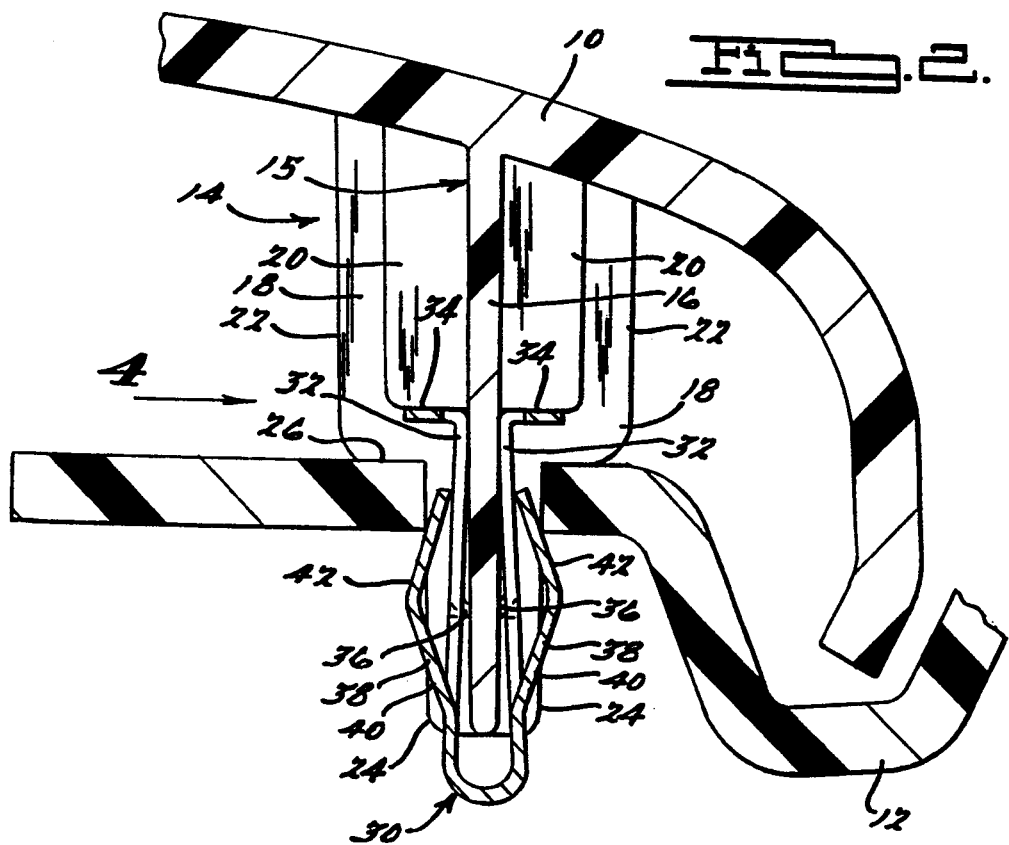
FIG. 2 is a sectional view taken along line 22 of FIG. 1.

Referring to FIGS. 2 and 3, the cover panel 10 is mounted on the trim bezel 12 through use of a locator and attachment apparatus, according to the present invention and generally indicated at 14. The locating and attachment apparatus 14 includes a projecting member, generally indicated at 15, having a wall portion 16 integral with the cover panel 10. The wall portion 16 projects outward and extends longitudinally. The projecting member 15 includes side portions 18 adjacent to edges of the wall portion 16 and mounted transverse the wall portion 16. The projecting member 15 also includes rib portions 20 formed integral with the wall portion 16 and provide stiffening and support for the wall portion 16. The side portions 18 further include a base portion 22 and a projecting portion 24. The intersection between the base portion 22 and the projecting portion 24 forms a stop face or shoulder 26 for a function to be described.

The locator and attachment apparatus 14 also includes a U-shaped clip, generally indicated at 30, attached to the wall portion 16 and adapted to be disposed over the wall portion 16. The clip 30 includes legs 32 having outwardly extending flange members 34 at one end. The flange members 34 are adapted to rest on and be supported by the rib portions 20. The clip 30 further includes locking prongs 36 which engage the wall portion 16 once the clip 30 is placed over the wall portion 16. The locking prongs 36 prevent removal or movement of the clip 30 in a direction which would cause the clip 30 to be removed from the wall portion 16. The clip 30 further includes outwardly extending locking projections 38 on each side thereof. The locking projections 38 include an outwardly tapered portion 40 forming a cam surface and a planar flat portion 42 forming a locking surface.

Referring to FIG. 3, once the clip 30 is placed on the wall portion 16, the clip 30 may then be inserted into an elongated slot 44 on the trim bezel 12. The overall dimensions, i.e. width and length, of the locator and attachment apparatus 14 are commensurate with the dimensions of the slot 44. In some instances, while the width of the slot 44 corresponds with the width of the projecting portion 24 of the side portion 18, the length of the slot 44 may be longer than the overall length of the projecting member 15, i.e. the length of the wall portion 16 from side portion 18 to side portion 18 allows for some adjustment of the cover panel 10. It should be appreciated that more than one locator and attachment apparatus 14 is typically used, wherein each is placed transversely or at an angle with respect to the another, each then adjusting or positioning the cover panel 10 with respect to the trim bezel 12.

As illustrated in FIGS. 2 and 4, the clip 30 engages the slot 44 to hold or secure the cover panel 10 to the trim bezel 12. The shoulder 26 engages the trim bezel 12 to properly position the cover panel 10 on the trim bezel 12. The clip 30 is formed in such a manner that the flat or planer portions 42 are deflected and exert a positive or draw-down force on the locator and attachment apparatus 14 to keep the shoulder portions 26 in contact with the trim bezel 12. Further, the projecting portions 24 of side portions 18, being of the same width as the slot 44, prevent a relative side to side movement of the locator and attachment apparatus 14 in the slot 44. The flange portions 34 which rest on the rib portions 20 further support and relieve any stress occurring at or on the wall portion 16 resulting from insertion of the clip 30 and projecting portion 24 into the slot 44. Preferably, cover panel 10, projecting member 15 and trim bezel 12 are molded from a plastic material such as a polypropylene material. It should be appreciated that the overall size of the locator and attachment apparatus 14 may be reduced in accordance with the molding requirements to maintain the thickness of any of the individual wall, rib or side portion below the appropriate 1 to 2 ratio when comparing the thickness of the projecting members 15 to that of the overall thickness of the cover panel 10. Maintaining this ratio prevents any sink or depression from occurring in the viewing or outer surface of the cover panel 10.

Accordingly, the locator and attachment apparatus 14 operates on a locate, push and lock principal, whereby a projecting portion 24 is inserted into an elongated slot 44 in the trim bezel 12 properly locates the position of the cover panel 10 on the trim bezel 12 and is snapped into position by use of a clip 30 having outwardly extending locking prongs 36. The locator and attachment apparatus 14 has individual wall portions 16 positioned in such a manner as to have supporting ribs 20 and side portions 18 forming abutment shoulders 26, enables the overall thickness of each member to remain below the 1:2 thickness ratio limitation. Remaining below this ratio eliminates or reduces any possibility of a sink or depression forming in the outer or viewing surface of the cover panel 10. The locating and attachment apparatus 10 provides a structurally stable and efficient means by which the cover panel 10 may be attached to the trim bezel 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A locator and attachment apparatus for use in attaching a cover panel to a trim bezel comprising:
   a projecting member extending outward from said cover panel, said projecting member including a wall portion and side portions connected to said wall portion and positioned transversely thereto; and
   a U-shaped clip having a locking projection disposed over said wall portion wherein said locking projection extends outwardly, away from said wall portion, said clip mounted to said projecting member such that said projecting member engages the trim bezel prior to said locking projections engaging the trim bezel such that said projecting member first locates the proper position of the cover panel on the trim bezel prior to attaching the cover panel to the trim bezel through use of said clip.

2. A locator and attachment apparatus as set forth in claim 1 including a rib portion secured to and extending transversely from said wall portion.

3. A locator and attachment apparatus as set forth in claim 1 wherein said locking projection includes an outwardly tapered portion forming a cam surface and a planar portion parallel to said wall portion forming a locking surface.

4. A locator and attachment apparatus as set forth in claim 3 wherein said clip further includes outwardly extending flange portions.

5. A locator and attachment apparatus as set forth in claim 4 wherein said flange of said clip is supported by said rib portion.

6. A locator and attachment apparatus as set forth in claim 4 wherein said clip includes locking prongs inwardly projecting from of said clip, said locking prongs engaging said wall portion to prevent disengagement of said clip from said wall portion.

7. A locator and attachment apparatus as set forth in claim 1 wherein said projecting member and the cover panel are integrally formed of a plastic material.

8. A locator and attachment apparatus as set forth in claim 7 wherein said wall portion and side portion have a thickness ratio when compared with a thickness of the cover panel of 1:2.

9. A locator and attachment apparatus as set forth in claim 1 wherein the trim bezel includes a slot therein, said slot having sidewall surfaces and said locking projection including a cam surface engaging the sidewall surfaces of said slot, said sidewall surfaces deflecting said locking member inward and a planar portion which engages said sidewall surfaces of said slot to secure said projecting member in said slot.

10. A locator and attachment apparatus for use in attaching a cover panel to a trim bezel comprising:
 a projecting member extending outward from said cover panel, said projecting member including a wall portion and side portions connected to said wall portion and positioned transversely thereto;
 a U-shaped clip having a locking projection disposed over said wall portion wherein said locking projection extends outwardly, away from said wall portion, said clip mounted to said projecting member such that said projecting member engages the trim bezel prior to said locking projections engaging the trim bezel such that said projecting member first locates the proper position of the cover panel on the trim bezel prior to attaching the cover panel to the trim bezel through use of said clip; and
 said side portions including a post portion and a base portion, said base portion and said post portion intersecting to define a shoulder.

11. A locator and attachment apparatus for securing a cover panel to a trim bezel comprising:
 a projecting member extending outwardly from the cover panel, said projecting member including a wall portion and side portions positioned transverse and secured to said wall portion;
 a U-shaped clip having locking projections thereon disposed about said projecting member, said locking projections including a cam surface and a locking surface, said surfaces positioned to engage and be deflected by engagement with a slot in the trim bezel; and
 wherein said side portions include a post portion and a base portion, wherein said post portion and base portion have a common interface which defines a shoulder.

12. A locator and attachment apparatus as set forth in claim 11 including a rib portion adjacent and secured to said projecting member.

13. A locator and attachment apparatus as set forth in claim 12 wherein said clip further includes outwardly extending flange portions, said flange portions engaging and supported by said rib portion.

14. A locator and attachment apparatus as set forth in claim 13 wherein said projecting member is made of a polypropylene material wherein a ratio of thickness of said projecting member to the cover panel is approximately 1:2.

15. A locator and attachment apparatus as set forth in claim 14 wherein said clip further includes inwardly extending locking prongs on said clip, said locking prongs engaging said wall portion.

16. A locator and attachment apparatus as set forth in claim 11 wherein said post portion has a width equal to a width of the slot in the trim bezel and said base portion has a width greater than a width of the slot thereby defining a shoulder; and
 said locking surface outwardly biased to develop a positive, draw-down force to keep the said shoulder engaged with the trim bezel.

17. A locator and attachment apparatus for attaching a cover panel to a trim bezel comprising:
 a projecting member extending outwardly from the cover panel, said projecting member including a planar wall portion, side wall portions positioned transverse to and secured to said wall portion, said side wall portions further including a post portion and a base portion wherein said post portion and base portion intersect and define a shoulder portion;
 a rib portion secured to said wall portion and extending outwardly and transversely therefrom;
 a U-shaped clip disposed over said wall portion, said clip including locking projections, said locking projections including an outwardly tapered portion forming a cam surface and a planer portion substantially parallel to said wall portion forming a locking surface, said clip further including an outwardly extending flange portion, said flange portion engaging and supported by said rib portion.

18. A locator and attachment apparatus as set forth in claim 17 wherein said projecting member and cover panel are formed of a polypropylene material wherein a ratio of thickness of portions of said projecting member and a thickness of the cover panel is approximately 1:2.

* * * * *